March 16, 1926.
J. G. THYNNE
MOWING MACHINE
Filed Dec. 1, 1924
1,576,878
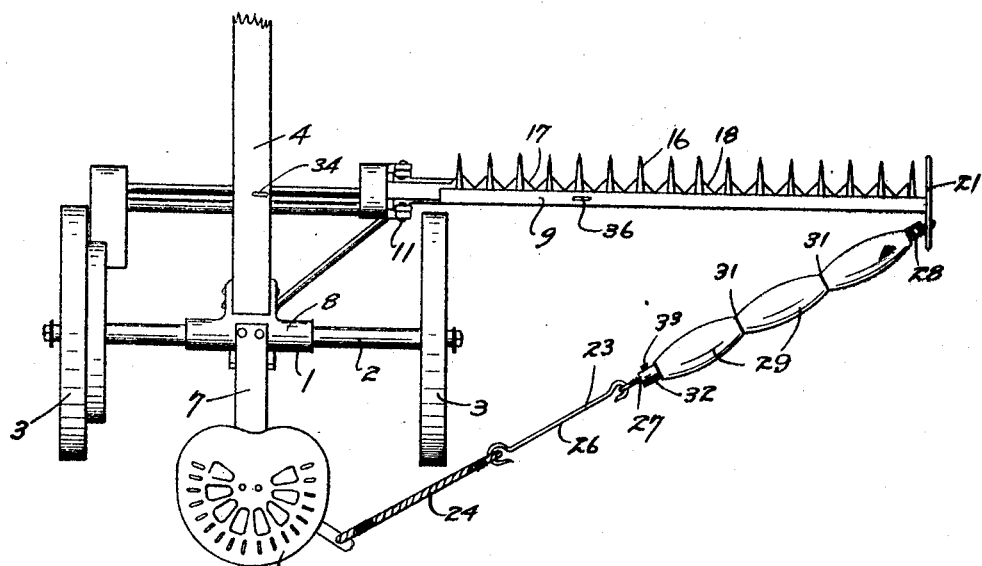
Fig I
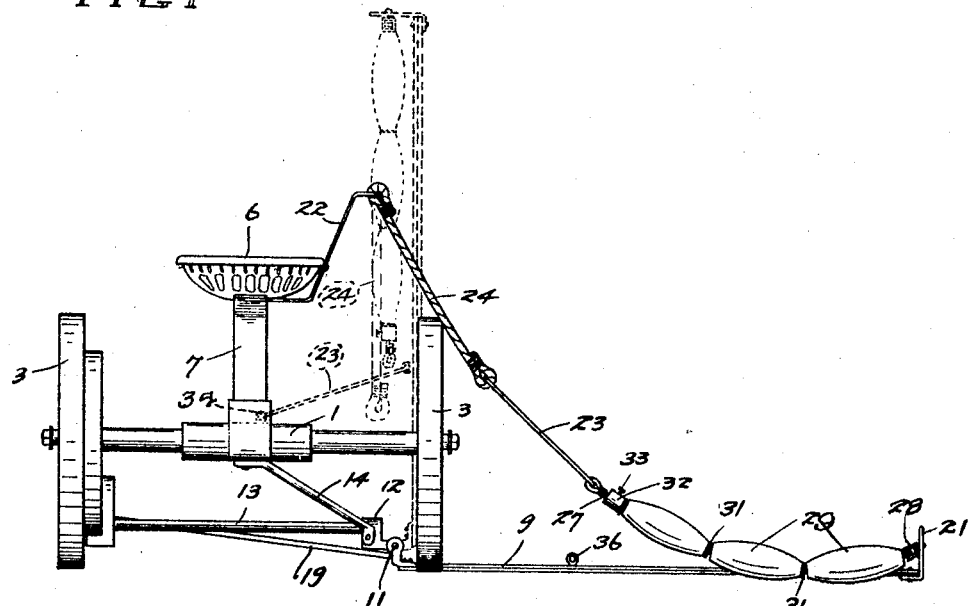
Fig II
INVENTOR
J. G. THYNNE
BY
ATT'YS Patented Mar. 16, 1926.

1,576,878

UNITED STATES PATENT OFFICE.

JOHN G. THYNNE, OF TULAMEEN, BRITISH COLUMBIA, CANADA.

MOWING MACHINE.

Application filed December 1, 1924. Serial No. 753,303.

*To all whom it may concern:*

Be it known that I, JOHN G. THYNNE, a citizen of the Dominion of Canada, and a resident of Tulameen, British Columbia, Canada, have invented a new and useful Mowing Machine, of which the following is a specification.

The present invention relates to improvements in mowing machines and has particular reference to means for turning over the outer edge of the swath so as to clear a space along the edge of the standing grass for facilitating the cutting of the next succeeding swath. At the present time, it is customary to provide for this purpose a board secured to the outer end of the cutter or sickle bar, the board extending at an angle and pushing the outer portion of the swath inwardly. This so-called swath board is not very efficient particularly where the grass to be cut is heavy and furthermore, constitutes an undue weight at the end of the sickle bar interfering with the free advance of the same. The sickle bars are usually arranged to pivot at their inner ends so that they may be swung into a vertical inactive position when it is desired to move the mowing machine from place to place, and the swath board which usually is of considerable length makes the sickle bar unwieldy and causes the same to sway back and forth particularly when the mowing machine has to traverse rough ground. Not unfrequently it happens that the heavy swath board causes the sickle bar to drop out of its vertical position and also has a tendency to bend the sickle bar whereby the same is rendered inoperative. In extreme cases the weight of the swath board swinging back and forth may even break the sickle bar. It is proposed in the present invention to substitute for the swath board a device that will not cause such disadvantages and that consists principally of a flexible connection between the end of the sickle bar and the seat with a plurality of rollers mounted on the connection which rollers tend to throw the grass near the edge of the swath inwardly. It is further proposed to make this connection jointed so that that portion carrying the rollers may be disconnected and be allowed to suspend freely from the end of the sickle bar when the latter is raised into a vertical position. It is further proposed to incorporate in this connection a rigid link that may be used as a tie bar for holding the sickle bar to the pole of the mowing machine when the sickle bar is raised. Further objects and advantages of my device will appear as the specification proceeds.

The preferred form of the invention is illustrated in the accompanying drawing, in which—

Figure 1 shows a top plan view of a mowing machine having my improved device for turning the edge of the swath attached thereto, and Figure 2 a rear view of the same arrangement.

While I have shown only the preferred form of the invention, it should be understood that various changes or modifications may be made within the scope of the claims hereto attached without departing from the spirit of the invention.

The mowing machine 1 is of conventional construction and comprises an axle 2 supported on the wheels 3, a pole 4 extending forwardly from the axle, and a seat 6 at the end of a spring 7 secured to the casting 8 resting on the axle. The sickle bar 9 extends laterally from the frame structure and is pivoted as shown at 11 to the casting 12 secured at the end of a stationary bar 13 braced by the rod 14 so that the sickle bar may be swung from a horizontal into a vertical position. The sickle bar is toothed as shown at 16, and has a sickle 17 slidable therein, the blades 18 of the sickle cooperating with the teeth 16 of the sickle bar in cutting the grass. The sickle is reciprocated in the sickle bar by means of the pitman 19 which is reciprocated by well known means not illustrated in the drawing. The extreme end of the sickle bar has a bracket 21 secured thereto and the latter is connected to a bracket 22 extending from the seat 6 by means of a rather loosely depending medium 23. The latter consists preferably of a rope 24 secured to the bracket 22, a rigid rod 26 having hooks on either end, one of which engages with a loop in the rope 24 and a second rope 27 connecting the other hook with the bracket 21, the latter connection being preferably made through a swivel joint 28. The rope 27 has a plurality of rollers 29 revolvable thereon, the rollers being preferably oval in form and separated by suitable washers 31. The most remote roller bears on a sleeve 32 fastened to the rope by means of a set screw 33.

The pole 4 has an eye 34 fastened to its upper face in alinement with the sickle bar and the latter has a corresponding eye 36 secured to its upper face at a point preferably somewhat higher than the pole when the sickle bar is turned into a vertical position.

When the mowing machine is used for cutting grass or the like, my device is attached in the manner illustrated in Figure 1, that is, the rope 24 is attached to the bracket 22, the rope 27 with the rollers thereon is attached to the bracket 21 and the rigid link 26 connects the two ropes in such a manner that there is considerable slack in the whole connection between the two brackets as illustrated in Figure 2. As the mowing machine is advanced for cutting the grass, the rollers 29 roll over the surface of the ground and engage with the grass at the outer edge of the swath so as to push the grass over toward the mowing machine and to clear a space near the edge of the grass remaining standing. It will be readily seen that the swaying motion of the common swath board is entirely eliminated, that the rollers do not in any way interfere with the backing up of the mowing machine, and I have found in actual practise that the rollers are much superior to the swath board in clearing the ground, particularly where the grass is very heavy. When it is desired to move the mowing machine without cutting, and to swing the sickle bar for this purpose into a vertical position, it is only necessary to disconnect the rigid link 26 from the two ropes which allows the rope carrying the rollers to be freely suspended from the bracket 21 without developing an undue tendency of bending or breaking the sickle bar in the fashion of a long swath board, while the rope 24 is suspended from the bracket 22 without in any way interfering with the operation of the machine. The rigid link 26 is engaged through the hooks at the ends thereof with the two eyes 34 and 36 of the pole and the sickle bar respectively, and serves then as a tie bar for securely holding the sickle bar in its vertical position.

I claim:

1. In combination with a mowing machine having a cutting device extending laterally therefrom for cutting a swath, means for throwing the outer edge portion of the swath inwardly comprising a connection between the end of the cutting device and a rearward point of the main portion of the mowing machine and rollers mounted thereon near the end of the cutting device.

2. In combination with a mowing machine having a cutting device extending laterally therefrom for cutting a swath, means for throwing the outer edge portion of the swath inwardly comprising a flexible connection between the end of the cutting device and a rearward point of the main portion of the mowing machine and rollers mounted thereon near the end of the cutting device.

3. In combination with a mowing machine having a wheel supported axle, a seat supported relative thereto and a cutting device extending laterally therefrom for cutting a swath, means for throwing the outer edge portion of the swath inwardly comprising a flexible connection between the end of the cutting device and the seat and rollers mounted thereon near the end of the cutting device.

4. In combination with a mowing machine having a cutting device extending laterally therefrom for cutting a swath and made to be swung upwardly into a vertical position, means for throwing the outer edge portion of the swatch inwardly comprising a flexible connection between the end of the cutting device and a rearward point of the main portion of the mowing machine and rollers mounted thereon near the end of the cutting device, the connection being jointed to allow the portion carrying the rollers to be disconnected and to freely suspend from the end of the cutting device when the latter is swung upwardly.

5. In combination with a mowing machine having a cutting device extending laterally therefrom for cutting a swath and made to be swung upwardly into a vertical position, means for throwing the outer edge portion of the swath inwardly comprising a flexible connection between the end of the cutting device and a rearward point of the main portion of the mowing machine and rollers mounter thereon near the end of the cutting device, the connection being jointed to allow the portion carrying the rollers to be disconnected and to freely suspend from the end of the cutting device when the latter is swung upwardly, and the connection also containing a rigid detachable link adapted to be used for connecting the vertical cutting device to the pole of the mowing machine.

JOHN G. THYNNE.